United States Patent [19]
Toyabe et al.

[11] Patent Number: 5,431,892
[45] Date of Patent: Jul. 11, 1995

[54] PROCESS FOR RECOVERING VALUABLE METAL FROM WASTE CATALYST

[75] Inventors: Keiji Toyabe, Toukai; Kenji Kirishima, Katsuta; Haruo Shibayama, Toubai; Hideo Hanawa, Katsuta, all of Japan

[73] Assignee: Sumitomo Metal Mining Co., Ltd., Tokyo, Japan

[21] Appl. No.: 267,524

[22] Filed: Jun. 29, 1994

[30] Foreign Application Priority Data

Mar. 11, 1994 [JP] Japan .................................. 6-067631

[51] Int. Cl.$^6$ ..................... B01D 11/00; C01G 39/00; C01G 31/00; C22B 23/00
[52] U.S. Cl. .................................. 423/54; 423/150.2; 423/658.5; 423/144; 423/114; 423/56; 423/58; 423/63; 423/68; 423/132; 502/24
[58] Field of Search ................. 423/150.2, 658.5, 144, 423/114, 54, 56, 58, 63, 68, 132; 502/24

[56] References Cited

U.S. PATENT DOCUMENTS

| | | | |
|---|---|---|---|
| 1,752,641 | 4/1930 | Kjellgren | 423/114 |
| 2,902,345 | 9/1959 | Hyde et al. | 423/144 |
| 4,145,397 | 3/1979 | Toida et al. | 423/150.2 |
| 4,595,666 | 6/1986 | Ganguli | 423/150.2 |
| 4,657,745 | 4/1987 | Hyatt | 423/150.2 |
| 4,721,606 | 1/1988 | Tilley | 423/150.2 |
| 4,861,565 | 8/1989 | Sefton et al. | 423/150.2 |
| 5,013,533 | 5/1991 | Howard et al. | 423/133 |

OTHER PUBLICATIONS

H. S. Nagarajaiah, "Recovery of Nickel from Spent Catalyst Obtained in Oil Hydrogenation Industry" in *Research & Industry*, vol. 13, Apr.–Jun. 1968, pp. 69–72.
R. N. Tiwari et al., "Factors Affecting the Recovery of Nickel Oxide–Alumina and Nickel Oxide–Silica Type Catalysts" in *Technology*, vol. 9, Nov. 2 and 3 (1972), pp. 134–138, no month.
P. R. Raisoni et al., "Leaching of Cobalt and Molybdenum . . . Sulphur Dioxide" in *Minerals Engineering*, vol. 1, No. 3 (1988), pp. 225–234, no month.
M. Stankovic, "Effect of pH . . . Spent Vanadium Catalysts" in *Hungarian Journal of Industrial Chemistry*, vol. 20 (1992), pp. 189–192, no month.
P. R. Raisoni et al., "Physicochemical Aspects . . . Using DMSO–SO$_2$ Mixed Solvent" in *Ind. Eng. Chem. Res.*, vol. 29, No. 1 (1990), no month, pp. 14–21.
B. W. Jong, "Recovery of Principal Metal Values From Waste Hydroprocessing Catalysts" in *Report of Investigations*, 9252, U.S. Dept. of Interior (1989), pp. 1–61, no month.
J. A. Bonucci et al., "Recovery of PGM from Automobile Catalytic Converters" in *Precious Met. Min. Extra. Process*, Proc. Ing. Symp. (1984), pp. 463–481, no month.
R. F. Sebenik et al., "Recovery of Metal Values . . . and Preliminary Economics" in *Prepr.–Am. Chem. Soc., Div. Pet. Chem.* Sep. 12–14 (1982), pp. 674–678.

*Primary Examiner*—Steven Bos
*Attorney, Agent, or Firm*—Watson, Cole, Grindle & Watson

[57] ABSTRACT

A process for recovering valuable metals from a waste catalyst based on an alumina carrier includes (a) roasting the waste catalyst at a temperature range of 400° to 1,000° C. to obtain a roasted product; (b) preparing a reduction dissolution by dissolving the roasted product with sulfuric acid in the presence of a metal as a dissolution catalyst; (c) separating a large part of the aluminum from the reduction dissolution solution and recovering aluminum as ammonium aluminum sulfate from the solution, optionally after subjecting the reduction dissolution solution to a treatment of removing iron; (d) extracting molybdenum as a molybdate by solvent extraction from the solution after separating and recovering aluminum from the solution; (e) extracting vanadium as a vanadate by solvent extraction from the solution obtained as a residue after extracting molybdenum; and (f) recovering nickel and cobalt each as a hydroxide from the extraction residue after recovering vanadium.

13 Claims, 1 Drawing Sheet

PROCESS FOR RECOVERING VALUABLE METAL FROM WASTE CATALYST

BACKGROUND OF THE INVENTION

1. Field of the Invention

The present invention relates to a process for recovering valuable metals from a waste catalyst or waste catalysts carrying predominantly alumina.

2. Prior Art

Catalysts comprising an active metal such as molybdenum, nickel, and cobalt on a catalyst carrier made of alumina or alumina containing a small amount of silica are generally used in the industrial field of organic chemistry. Those types of catalysts are used particularly as hydrodesulfurization catalysts in petroleum refining. However, the catalytic activity of these catalysts during their application to the hydrodesulfurization of petroleum is gradually impaired by heavy metals such as vanadium and nickel that are delivered from the petroleum into the catalysts. Accordingly, these catalysts must be disposed of after their use for a predetermined duration of time. The so-called waste catalysts are produced in this manner.

However, the disordered disposal of these used catalysts is problematic in various aspects. The recovery of precious metals from such waste catalysts has been found very important, not only from the viewpoint of preventing environmental pollution but also from the viewpoint of conserving and reusing resources. Accordingly, a variety of processes and methods have been proposed heretofore to seek solution of the aforementioned problem, and some of them have already been put into practice.

Known methods for recovering valuable metals from waste catalysts proposed to date can be classified into two types; one aims to recover only vanadium and molybdenum from the waste catalysts, and the other aims to recover not only vanadium and molybdenum, but also nickel and cobalt.

The methods belonging to the former type include those disclosed in U.S. Pat. No. 4,087,510 and JP-A-47-31892 (the term "JP-A-" as used herein signifies Japanese Patent laid-open application for public inspection). For example, the process disclosed in U.S. Pat. No. 4,087,510 comprises adding caustic soda or sodium carbonate to the waste catalyst to roast it so as to convert vanadium and molybdenum in the waste catalyst to water-soluble sodium salts, leaching the thus formed water-soluble sodium salts with water and separating and recovering vanadium and molybdenum from the leachate. The process disclosed in JP-A-47-31892 comprises subjecting a waste catalyst to an oxidizing roasting, then further roasting the thus roasted waste catalyst with addition of caustic soda or sodium carbonate, leaching the further roasted waste catalyst with water and separating and recovering vanadium and molybdenum from the leachate.

The aforementioned two processes comprise roasting the waste catalyst at a high temperature. This treatment allows nickel and cobalt to form a complex oxide with the alumina in the carrier, or allows alumina itself to undergo structural transformation from $\tau$-$Al_2O_3$ to $\alpha$-$Al_2O_3$ (corundum). A corundum-type structured alumina is extremely stable against acids and alkalis; thus, after the structural transformation, it happens that vanadium and molybdenum are selectively leached into the leachate from the thus roasted waste catalysts. Accordingly, the process above can be said ideal in selectively recovering vanadium and molybdenum, however, it is useless from the viewpoint of recovering all the valuable metals from the waste catalysts.

In view of the recent demands of conserving natural resources, there have been many proposals for recovering valuable metals such as nickel and cobalt in addition to vanadium and molybdenum from the waste catalyst, the proposals of which being made by JP-A-47-21387, JP-A-54-107801 or JP-A-51-73998, each disclosing a process for recovering valuable metals from the waste catalyst. That is, JP-A-47-21387 discloses a process comprising subjecting the waste catalyst to the oxidizing roasting to remove organic matter, sulfur or like therefrom and then leaching with use of ammonia water the valuable metals such as vanadium, molybdenum, nickel and cobalt from the waste catalyst in normal pressures or under pressure. JP-A-54-107801 discloses a process which comprises subjecting the waste catalyst to the oxidizing roasting at a temperature of from 300° to 1000° C., adding chlorine gas to the thus roasted waste catalyst to chlorinate the valuable metals such as vanadium, molybdenum, nickel and cobalt in the waste catalyst and leaching and recovering the chlorinated valuable metals. JP-A-51-73998 discloses a process which comprises roasting the waste catalyst in a vapor atmosphere to remove the organic matters from the waste catalyst and leaching with use of a highly concentrated acid the valuable metals such as vanadium, molybdenum, nickel and cobalt from the waste catalyst.

However, any of these prior art processes as above mentioned provides an insufficient leaching ratio with respect to nickel or cobalt and also an insufficient dissolution of alumina content so that it may result in obtaining an aluminum solution containing vanadium, molybdenum, nickel and cobalt as a leachate. In the recovery of vanadium, molybdenum, nickel and cobalt from such an alumina solution as above mentioned, the aluminum content in the solution will interfere with the extracting or recovering process and the insufficient content and the insufficient leaching ratio of the metals will also prevent an efficient recovery.

Therefore, it can be said that there has been no proposal of a process for efficiently recovering the valuable metals such as vanadium, molybdenum, nickel and cobalt from the waste catalyst on an industrial scale.

SUMMARY OF THE INVENTION

In the light of the aforementioned circumstances, the present invention provides a solution to the problems concerning the recovery of valuable metals from waste catalysts. Accordingly, an object of the present invention is to provide a novel and efficient process for recovering valuable metals from waste catalysts.

In order to achieve the object as above mentioned the present invention provides a process for recovering the valuable metals from a waste catalyst or waste catalysts, the process of which comprising the steps of:

(a) roasting the waste catalyst at a temperature of from 400° to 1000° C. to form a roasted product;

(b) dissolving the roasted product by sulfuric acid in the coexistence of a soluble metal catalyst to prepare a reducing solution;

(c) separating and recovering most of aluminum from the reducing solution as aluminum sulfate, the reducing solution of which being pre-treated, if necessary, to remove iron content therefrom;

(d) after separation and recovery of aluminum, separating and recovering molybdenum from the reducing solution as molybdate by a solvent extraction method;

(e) after separation and recovery of molybdenum, separating and recovering vanadium from the reducing solution as vanadate by the solvent extraction method;

(f) after separation and recovery of vanadium separating and recovering nickel and cobalt from the reducing solvent as a hydroxide.

BRIEF DESCRIPTION OF THE DRAWING

The FIGURE is the flow diagram of the process steps according to a representative process of the present invention.

DETAILED DESCRIPTION OF THE INVENTION

Figure 1:
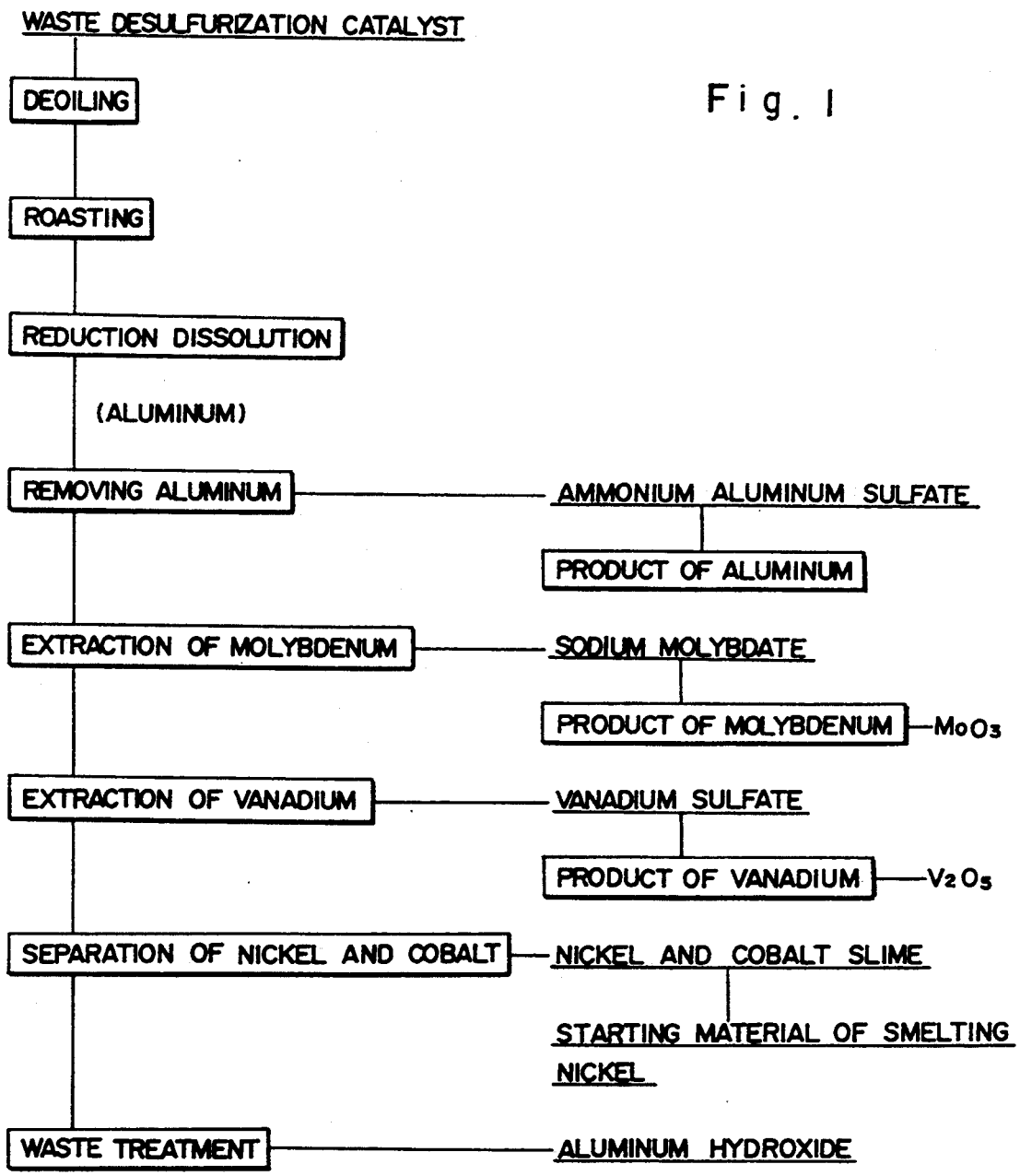

More specifically, the present invention is directed to a process for separating and recovering the valuable metals from a waste catalyst or waste catalysts carrying predominantly alumina, the process of which comprises: subjecting the waste catalyst, if necessary, to a deoiling treatment to remove an oil content therefrom: roasting the thus treated waste catalyst to from a roasted product; dissolving the roasted product with sulfuric acid in a soluble metal catalyst to obtain a reducing solution; contacting the thus obtained reducing solution with a hydrogen sulfate gas to remove an iron content in the reducing solution while converting the iron content to iron sulfide; then adding ammonia to the reducing solution to deposit an aluminum content in the reducing solution as an aluminum.ammonium sulfate $[(NH_4)_2SO_4.Al_2(SO_4)_3.24H_2O]$ (ammonium alum) which is a crystalline composite compound having an excellent filterability; separating and recovering the thus deposited aluminum; and after completing the recovery of the aluminum from the reducing solution, separating and recovering molybdenum, vanadium, nickel and cobalt successively from the reducing solution.

For recovering molybdenum from the reducing solution after completion of the recovery of aluminum, an organic phase containing a predetermined molybdenum extracting agent is in contact with the reducing solution to separate a molybdenum-containing organic phase and a residual solution, from which molybdenum was extracted, from each other. Then, an alkaline solution is used to reversely extract molybdenum from the molybdenum-containing organic phase, thereby obtaining a molybdate solution and an organic phase for extracting a regenerated molybdenum. Thereafter, molybdenum is recovered from the molybdate solution. The organic phase for extracting a regenerated molybdenum is re-usable for the molybdenum extraction. For recovering vanadium, an organic phase containing a predetermined vanadium extracting agent is in contact with the residual solution, from which molybdenum was extracted, to separate a vanadium-containing organic phase and a residual solution, from which vanadium was extracted from each other. Then a mineral acid is used to reversely extract vanadium from the vanadium-containing organic phase, thereby obtaining a vanadium-containing solution and an organic phase for extracting a regenerated vanadium. Thereafter, vanadium is recovered from the vanadium-containing solution. The organic phase for extracting a regenerated vanadium is re-usable for the vanadium extraction.

For recovering nickel and cobalt, a caustic alkaline solution is added to the residual solution, from which vanadium was recovered, to properly adjust pH of the residual solution, thereby separating and recovering nickel and cobalt in the residual solution as a hydroxide. The residual solution is in contact with a chelating resin comprising a combination of iminodiacetate exchanger group and aminocarboxylate group so that a slight amount of nickel and cobalt remained in the residual solution may be adsorbed in the chelating resin and then freed from the residual solution by use of sulfuric acid. The thus obtained free residual solution can be reused for the above-mentioned reducing dissolution step.

The preferred embodiment of the present invention will now be described in respect of the above-mentioned steps:

(1) The dissolution step of the roasted product comprises dissolving the roasted product at a temperature of 70° C. or higher, preferably, at a temperature of from 80° to 90° C., using at least one metal selected from the group consisting of aluminum, nickel, and cobalt, preferably, aluminum, as the dissolution catalyst. The reducing solution is obtained in this manner.

(2) The step of separating and recovering aluminum comprises, if necessary, bringing hydrogen sulfide gas into contact with the reducing solution to allow iron to precipitate in the form of iron sulfide. Then, at least one selected from the group consisting of ammonia gas, ammonia water, ammonium sulfide, and ammonium carbonate is added into the residual solution obtained after separating iron sulfide from the solution, thereby precipitating aluminum in the form of crystalline ammonium aluminum sulfate (ammonium alum). The precipitates containing aluminum thus prepared are separated and recovered from the solution, and the residual solution is used as a starting solution for extracting molybdenum.

(3) The step of separating and recovering molybdenum comprises controlling the pH value of the aforementioned starting solution for extracting molybdenum in the range of from 0 to 4, and separating the solution into a molybdenum-containing organic phase and a residual solution after extracting molybdenum. This step is effected by adding an organic phase containing an extracting agent at least one selected from secondary amines expressed by a general formula $R_1$-NH-$R_2$ having $R_1$ and $R_2$ groups each being an alkyl group havng from 12 to 13 carbon atoms, preferably N-dodecenyl(trialkylmethyl)amine and/or N-lauryl(trialkylmethyl)amine, and at least one diluent selected from aromatic hydrocarbons and paraffin hydrocarbons at a ratio by weight of the extracting agent to the diluent from 2:98 to 20:80; and reverse extracting molybdenum using an alkaline solution. The reverse extraction is preferably effected using a caustic alkali solution at a concentration of from 0.5 to 5 mol/liter, or an ammonia water at a concentration of 0.5 mol/liter.

(4) The step of separating and recovering vanadium comprises setting the pH value of the starting solution for extracting molybdenum the range of from 1 to 4; extracting vanadium from said residual solution obtained after recovering molybdenum into a vanadium-extracting organic phase, by using an organic phase containing mono-2-ethylhexyl 2-ethylhexylsulfonate as an extracting agent and at least one diluent selected from aromatic hydrocarbons and paraffin hydrocarbons at a ratio by weight of the extracting agent to the diluent from 20:80 to 70:30; and reverse extracting vanadium as vanadium sulfate or vanadium chloride by adding a mineral acid solution of sulfuric acid or hydrochloric acid as a reverse extracting agent into said organic phase. The reverse extraction of vanadium is preferably effected using a mineral acid solution at a concentration of from 0.05 to 2 mol/liter.

(5) The step of separating and recovering nickel and cobalt comprises adding caustic alkali into the vanadium extraction residue above to separate and recover nickel and cobalt in the form of hydroxide precipitates. The type of caustic alkali, pH value, and the other conditions for effecting this step can be determined according to the known conditions for generating hydroxides. Nickel and cobalt which remain in trace amounts in the residual solution after the recovering step above can be recovered by bringing the residual solution into contact with a chelate resin of combined type comprising an iminodiacetate exchange group type and an aminocarboxylate exchange group type to adsorb nickel and cobalt which are present in trace amounts in the residual solution as an SV of from 10 to 20; and dissolving and eluting the adsorbed nickel and cobalt at a similar SV using a 5 to 20% by weight of sulfuric acid. The resulting eluate is reused in the step of obtaining the reducing solution described above.

The adsorption residue obtained after recovering nickel and cobalt each in trace amounts therefrom is sent to the step of waste water treatment. The adsorption residue is subjected to neutralization treatment and the like in this step, and discharged as a waste solution thereafter.

The process according to the present invention is described in a still further detail below.

The waste catalyst to which the process of the present invention is applied is the catalyst carrying predominantly alumina. The waste catalyst contains in most cases oil content depending on the condition where it was used or the condition where it was discharged from a reaction apparatus. If the catalyst contains oil in a large quantity, in particular, it is found extremely difficult to control the temperature during the roasting step of the waste catalyst, which is described hereinafter. Accordingly, it is required to decrease the oil content to such an extent that substantially no problem should occur during the roasting step. The oil component can be removed by employing the cleaning process for waste catalysts using a volatile low molecular organic solvent, or by heating the waste solvent under a neutral or a non-oxidizing atmosphere to vaporize the oil component.

The steps of the process according to the present invention for separating and recovering valuable metals from waste catalyst are each described in further detail below.

(1) Roasting Step

The process according to the present invention comprises roasting the waste catalyst in the temperature range of from 400° to 1,000° C.; optionally, if necessary, after subjecting the waste catalyst to deoiling treatment described above. The main purpose of the roasting step is to remove carbon content and to change the form of the valuable metals into oxides. As a matter of course, there are additional purposes for the roasting step such as removing oil and sulfur components present in small amount in the waste catalyst, and oxidizing sulfur into sulfuric acid.

The roasting step must be effected at a temperature of 400° C. or higher. If the waste catalyst were to be roasted at a temperature lower than 400° C., the rate of oxidation reaction of the valuable metals, sulfuric components, etc., becomes too low and the reaction consumes exceedingly long duration of time before completion. Too sluggish a reaction is not favorable from the economical point of view. The waste catalyst must be roasted at a temperature lower than 1,000° C. If the roasting should take place at a temperature of 1,000° C., the rate of oxidizing the carbon components, sulfur components, and the like increases and the oxidation reaction tends to occur more surely. However with elevating temperature of roasting, the amount of the oxide products (such as those of molybdenum) that undergo volatilization increases and a larger amount of valuable metal tend to form complex oxides with alumina. These effects are not favorable. In fact, a complex oxide that results from a valuable metal and alumina is found to undergo dissolution at an unfavorably low dissolution rate in the subsequent step of dissolution.

(2) Reduction Dissolution Step

In the process according to the present invention, the roasted product of the waste catalyst is dissolved in sulfuric acid using a metal catalyst to accelerate the dissolution. The pH of the solution upon dissolution must be adjusted to a value of 4 or lower. If the pH value of the solution should be 4 or higher, alumina contained in the roasted product would undergo hydrolysis and form precipitates of aluminum hydroxide in the solution. If the pH value of the solution were to be set too low, an acid must be used in an economically unfeasible large quantity. Moreover, an excessively low pH value for the solution is not favorable because an alkali must be added in the later step of extracting molybdenum to control the pH value.

Metals for use as the dissolution catalyst include aluminum, tin, copper, nickel, cobalt, and magnesium. Considering that aluminum, nickel, cobalt, and a like metal are recovered in the process according to the present invention, the metal for use as the catalyst is preferably selected from the group consisting of aluminum, nickel, and cobalt. Particularly preferred as the metal catalyst among them is a low cost and readily available aluminum.

Strictly speaking, the temperature of dissolution depends on the concentration of sulfuric acid for use in the dissolution; however, it generally is in the range of from 70° to 100° C. An insufficient dissolution results if the temperature of dissolution is lower than 70° C. If the temperature of dissolution is higher than 100° C., the dissolution rate of the roasted product certainly increases; however, the metal added as the dissolution catalyst is also consumed at a large quantity. The consumption of the metal catalyst not only lowers the economical advantage, but also impairs the environmental conditions during the operation and requires use of a soecuak aud-resistant material for the apparatus.

The dissolution temperature can be controlled in the aforementioned range by taking advantage of the heat of dilution upon diluting sulfuric acid for use in the dissolution. For instance, a desired heat for controlling the solution in the temperature of a predetermined range can be assured by diluting a concentrated sulfuric acid having a concentration of 98% to an acid solution of a predetermined concentration. In general, a homogeneous reduction dissolution liquid can be obtained in about 40 minutes by dissolving the roasted product in this manner.

Although there is no special requirement for carrying out the dissolving step, in order to efficiently carry out the dissolution of the valuable metals and alumina in the roasted waste catalyst it will be preferable to adopt a counter-flow type or parallel-flow type reaction bath to continuously or discontinuously obtain the reducing solution or a reaction bath with an agitator.

The process according to the present invention can include a step of removing elements, such as iron, copper, and arsenic, which are contained in trace amounts in the dissolution solution as precipitates of sulfides by supplying a gas of hydrogen sulfide to said reduction dissolution solution upon the completion of the reduction dissolution step. This step lowers the load of the solvent extraction step to be described hereinafter. Iron, copper, arsenic, and the like can be removed as sulfides using a gas of hydrogen sulfide according to a known technology, and the detail thereof is not referred herein.

(3) Step of Removing Aluminum

The reduction dissolution solution thus obtained is generally used as it is as the starting solution for removing aluminum therefrom. The aluminum element in the reduction dissolution solution is present in the form of aluminum sulfate [$Al_2(SO_4)_3$]. Ammonia is added therein to precipitate the large part of aluminum in the form of ammonium aluminum sulfate (ammonium alum) to separate and recover aluminum from the solution. The temperature of the reduction dissolution solution is preferably maintained in the range of from 80° to 90° C. before adding ammonia, and is lowered immediately after the addition. The temperature of the reduction dissolution solution is controlled in this manner to utilize the difference in solubility of ammonium alum. The solubility of ammonium alum decreases at a temperature of about 50° C. or lower, and the crystals of ammonium alum rapidly precipitate upon attaining this temperature. The crystals of ammonium alum obtained in this manner are of high purity because impurities cannot be easily included in the crystal, and yet, they can be readily recovered by filtering. Ammonia for use in this step is preferably at least one selected from the group consisting of ammonium sulfate, ammonia gas, ammonium carbonate, and ammonia water. The reaction takes place effectively according to the following formula:

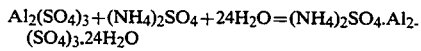

$$Al_2(SO_4)_3 + (NH_4)_2SO_4 + 24H_2O = (NH_4)_2SO_4 \cdot Al_2(SO_4)_3 \cdot 24H_2O \quad (1)$$

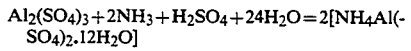

$$Al_2(SO_4)_3 + 2NH_3 + H_2SO_4 + 24H_2O = 2[NH_4Al(SO_4)_2 \cdot 12H_2O] \quad (2)$$

The residual solution obtained after separating and recovering ammonium alum can be used as it is as a starting solution in the next step for extracting molybdenum therefrom.

(4) Recovery Step of Molybdenum (4-1) Extraction of Molybdenum

The starting solution for extracting molybdenum therefrom in general contains molybdenum the form of hexavalent ions. The pH of the starting solution for extracting molybdenum therefrom is controlled to a proper value in the range of from 0 to 4. If the pH value should be set too low, the extraction efficiency tends to be impaired. If the pH value should be set too high, vanadium and residual aluminum present in the starting solution undergo hydrolysis to form precipitates of hydroxide. As long as the pH value of the solution is maintained within the aforementioned range, no unfavorable phenomena such as the generation of a third phase or crud occurs during the liquid-liquid separation.

Molybdenum is extracted using an organic extracting solution comprising a 2:98 to 20:80 mixture (by weight) of a extracting agent and a diluent. The extracting agent is specified as a secondary amine expressed by a general formula of $R_1$-NH-$R_2$ (where, $R_1$ and $R_2$ are each an alkyl group having from 12 to 13 carbon atoms), and the diluent is at least one selected from aromatic hydrocarbons and paraffin-type hydrocarbons. A secondary amine is used as the extracting agent because it allows the extraction of molybdenum without generating a third phase of a crud phase. More specifically, the use of N-dodecenyl(trialkylmethyl)amine and/or N-lauryl(trialkylmethyl) amine as the secondary amine is preferred for a more effective extraction. The diluent to be used in the process according to the present invention must be a hydrocarbon specified above. Those specified hydrocarbons can readily dissolve the above specified extracting agents and exhibit excellent phase separability with respect to the starting solution for extracting molybdenum therefrom. The mixing ratio of the extracting agent and the diluent for the organic extracting solution is set in the specified range above. If the amount of the extracting agent should be too small, the extraction efficiency would be lowered as to impair the economic advantage; if the extracting agent should be contained in an excessively large amount, on the other hand, the organic phase after extraction would excessively increase the viscosity thereof and consume a longer duration for the phase separation. In the latter case again, the process becomes economically unfeasible.

(4-2) Reverse Extraction of Molybdenum

After extracting molybdenum from the starting solution, molybdenum is recovered from the organic phase by reverse extraction using an aqueous alkaline solution such as an aqueous caustic alkali solution or ammonia water. In case of using aqueous caustic alkali solution as the aqueous alkaline solution, the concentration thereof is preferably set in the range of from 0.5 to 5 mol/liter. The reverse extraction can be effected at a favorable efficiency by controlling the concentration in this range, and yet, the viscosity of the solution can be maintained in a favorable range. In case of using ammonia water, the concentration is preferably set at a value of 0.5 mol/liter or higher. The concentration of the ammonia water in this case can be set to a considerably high value, because ammonium molybdate which is generated in the reverse extraction solution in this case remains in a favorable state in the reaction vessel without being incorporated in the organic phase. The kind of alkali to be used in the reverse extraction can be selected depending on the form of the molybdate to be finally recovered; if sodium molybdate is to be recovered, a sodium hydroxide solution is used in the reverse extraction step. If ammonium molybdate is the desired final product, ammonia water can be favorably used.

The residual solution after extracting molybdenum out of the solution as a molybdate is used as the starting solution for extracting vanadium therefrom.

(5) Recovery of Vanadium (5-1) Extraction of Vanadium using an Organic Extracting Solution The starting solution for extracting vanadium therefrom in general contains vanadium in the form of tetravalent ions. The pH of the starting solution for extracting vanadium therefrom is controlled to a proper value in the range of from 0 to 4. If the pH value should be set too low, the extraction efficiency tends to be impaired. If the pH value should be set too high, on the other hand, residual aluminum in the starting solution undergoes hydrolysis to form precipitates of hydroxide. As long as the pH value of the solution is maintained within the aforementioned range, no unfavorable phenomena such as the generation of a third phase or crud occurs during the liquid-liquid separation. In general, the pH of the starting solution for extracting vanadium can be controlled to a predetermined value by adjusting the acid content during the reducing extraction. Accordingly, no special control of pH value is necessary in this case.

Vanadium is extracted using an organic extracting solution comprising a 20:80 to 70:30 mixture (by weight) of a extracting agent and a diluent. The extracting agent is specified as mono-2-ethylhexyl 2-ethylhexylphosphonate, and the diluent is at least one selected from aromatic hydrocarbons and paraffin-type hydrocarbons. The extracting agent is specified as above because it allows the extraction of vanadium. The diluent to be used in the process according to the present invention must be a hydrocarbon specified above. Those specified hydrocarbons can readily dissolve the above specified extracting agents and exhibit excellent phase separability with respect to the starting solution for extracting vanadium. The mixing ratio of the extracting agent and the diluent for the organic extracting solution is set in the specified range above. If the amount of the extracting agent should be too small, the extraction efficiency would be lowered as to impair the economic advantage; if the extracting agent should be contained in an excessively large amount, on the other hand, the organic phase after extraction would excessively increase the viscosity thereof and consume a longer duration for the phase separation. Moreover, the presence of an extracting agent in too large an amount may unfavorably include impurities.

(5-2) Reverse Extraction of Vanadium

After extracting vanadium from the starting solution, vanadium is recovered from the organic phase by reverse extraction using a mineral acid such as sulfuric acid and hydrochloric acid. The concentration of the mineral acid solution is preferably set in the range of from 0.05 to 2 mol/liter. The reverse extraction can be effected at a favorable efficiency by controlling the concentration in this range, and yet, the viscosity of the solution can be maintained in a favorable range. The means of realizing the liquid-liquid contact is not particularly limited, and usable are the known liquid-liquid extraction apparatuses such as a column, a mixer-settler, and a centrifugal extractor. The solvent extraction of vanadium can be effected continuously using any of these apparatuses.

The residue obtained after extracting vanadium contains nickel and cobalt in large quantities, and it can be used as a starting solution for recovering nickel and cobalt therefrom.

(6) Recovery of Nickel and Cobalt

Nickel and cobalt can be separated and recovered from the solution residue obtained after extracting vanadium by controlling the pH value of the solution using an alkaline solution such as of caustic soda. In this manner, nickel and cobalt can be obtained as hydroxide precipitates.

After recovering nickel and cobalt each as hydroxides from the solution, the solution residue still contains nickel and cobalt in trace amounts. If necessary, these metals present in trace amount can be removed by adsorbing them with a resin having an iminodiacetate exchange group and a resin having an aminocarboxylate exchange group. In bringing the solution residue into contact with these resins, the resin may be each individually contacted with the solution residue, or may be mixed and then contacted with the solution residue.

In the process according to the present invention, the resin having an iminodiacetate exchange group for separating and collecting nickel and cobalt in trace amounts is capable of selectively adsorbing the atoms of valuable metals present in the waste catalyst in the form of divalent ions such as $Ni^{2+}$, $Co^{2+}$, $Fe^{2+}$, $Cu^{2+}$, and $VO^{2+}$. The resin having an aminocarboxylate exchange group is capable of selectively adsorbing the atoms of valuable metals in the form of ions other than the divalent ones, such as $Mo^{6+}$, $V^{5+}$, and $Fe^{3+}$. Furthermore, the adsorbed valuable metal elements can be easily eluted from the resin by using an acid. The acid used for the elution can be reused in the reduction dissolution step of the waste catalyst, and the chelate resin once subjected to the elution treatment can be used repeatedly by reproduction. Thus, the use of this resin is economically advantageous.

The adsorption and desorption of the metals are preferably effected in the range of SV10 to SV20, and the desorption treatment is preferably performed using a sulfuric acid solution at a concentration of from 5 to 20% by weight. The adsorption and desorption can be effected at high efficiency by thus setting the conditions. The other conditions can be set according to the ordinary unit control conditions.

As described in the foregoing the process according to the present invention enables recovery of molybdenum and vanadium each in the form of salts thereof from the valuable metals included in a waste catalyst. It also enables to recover nickel and cobalt each in the form of hydroxides. It also allows recovery of aluminum in the form of ammonium alum. The process according to the present invention is economical, because the recovered products can be used effectively as they are as starting materials in their respective industrial fields.

FIG. 1 is the flow diagram showing the steps of a representative process according to the present invention.

The present invention is illustrated in greater detail referring to non-limiting examples below. It should be understood, however, that the present invention is not to be construed as being limited thereto. The content shown below in percents (%) signifies "% by weight" unless otherwise stated.

EXAMPLE 1

(1) Roasting Step

A waste desulfurization catalyst based on an alumina carrier and previously subjected to deoiling treatment was mixed with a copper catalyst, and the mixture was charged in a rotary kiln of an external heating type to effect roasting at a temperature of 550° C. for a duration of 2 hours. Thus was obtained a roasted product containing 3.15% Ni, 1.22% Co, 5.81% Mo, 7.80% V, 1.06% S, 2.89% Cu, 0.55% Fe, 30.8% Al, and 0.11% C.

(2) Dissolution Step

A 140-g portion of the roasted product above was charged in a dissolution cell equipped with a rotary stirrer together with 1 g of aluminum (ribbons cut from waste aluminum cans) as a metal for use as a dissolution catalyst, and were dissolved while heating in 456 ml of a 10% sulfuric acid solution. During the dissolution, the entire solution was maintained at a temperature of 90° C. and stirred at a rate of 300 rpm while passing carbon dioxide gas. Upon the completion of the dissolution, water was added therein to obtain in total 1,000 ml of a reduction dissolution solution. The reduction dissolution solution thus obtained yielded a pH of 1.5, and a standard oxidation-reduction potential (Ag/AgCl) of 157 mV. The composition of the solution was found to contain the elements (in g/liter) as follows:

Ni: 4.4, Co: 1.7, Mo: 8.1, V: 11.1, Cu: 4.0, Fe: 0.7, Al: 43.6.

(3) Separation and Recovery of Aluminum

Hydrogen sulfide was passed through the reduction dissolution solution above, and the sulfide thus generated was subjected to solid-liquid separation to obtain a slime of the sulfide. The solution recovered after the solid-liquid separation was found to contain 0.41 g/liter of copper and less than 0.01 g/liter of iron.

The solution thus recovered was heated to a temperature of 80° C. and ammonium sulfate was added therein to control the pH of the solution to a range of from 2 to 3. The solution was cooled thereafter to recover ammonium alum by solid-liquid separation. The ammonium alum precipitate was rinsed using cold water. The solution residue obtained after recovering aluminum and the rinsing liquid used in rinsing the precipitate were mixed to obtain the starting solution for extracting molybdenum therefrom. The starting solution for extracting molybdenum yielded a pH of 4.0 and a standard oxidation-reduction potential (Ag/AgCl) of −73 mV. Furthermore, the solution was found to contain elements (in g/liter) as follows:

Ni: 6.1, Co: 2.4, Mo: 10.9, V: 16.4, Al: 5.1, Cu: 0.61, Fe: less than 0.01.

The sulfide slime thus obtained was readily usable as a starting material in copper smelting. Furthermore, the ammonium alum was suitable for use as the material for producing high purity alumina (sodium-free alumina).

(4) Separation and Recovery of Molybdenum (4-1) Extraction of Molybdenum

The pH of the starting solution for extracting molybdenum thus obtained was controlled to fall in the range of from 2 to 3 by adding sulfuric acid. A xylene solution containing 5% of an N-lauryl(trialkylmethyl)amine was used as an organic phase for extracting molybdenum. The starting solution for extracting molybdenum and the organic phase for extracting molybdenum were mixed at a ratio of 1:1, and the mixture was shaken for 5 minutes to extract molybdenum into the organic phase. The solution residue after the extraction was found to contain molybdenum at a concentration of less than 0.01 g/liter. The solution residue thus obtained was used as the starting solution for extracting vanadium.

(4-2) Reverse Extraction of Molybdenum

A 2-mole/liter ammonia water was added into the organic phase obtained after the extraction of molybdenum to recover molybdenum as ammonium molybdate by reverse extraction. The organic phase was regenerated for use again as the organic phase for extracting molybdenum.

(5) Separation and Recovery of Vanadium (5-1) Extraction of Vanadium

A xylene solution containing 50% of mono-2-ethylhexyl 2-ethylhexylphosphonate used as an organic phase for extracting vanadium. The starting solution for extracting vanadium and the organic phase for extracting vanadium were mixed at a ratio of 1:1, and the mixture was shaken for 5 minutes to extract vanadium into the organic phase. The solution residue after the extraction was found to contain vanadium at a concentration of less than 0.02 g/liter. The solution residue thus obtained was used as the starting solution for extracting nickel and cobalt.

(5-2) Reverse Extraction of Vanadium

A 5% sulfuric acid solution was added into the organic phase obtained after the extraction of vanadium to recover vanadium as vanadium sulfate by reverse extraction. The organic phase was regenerated for use again as an organic phase for extracting vanadium.

(6) Recovery of Nickel and Cobalt

The pH of the starting solution for extracting nickel and cobalt thus obtained was controlled to fall in the range of from 7 to 10 by adding caustic soda solution. The resulting product was subjected to solid-liquid separation to recover the hydroxides generated by the addition of caustic soda solution. The solution residue thus obtained after the solid-liquid separation was found to contain the following elements (in g/liter):

Mo: less than 0.01, V: less than 0.01, Fe: less than 0.01, Cu: 0.41, Ni: 0.04, Co: 0.44, Al: 0.57.

The hydroxide slime thus obtained was readily usable as a starting material in smelting nickel.

It can be seen from the foregoing that the solution residue obtained after the solid-liquid separation contains nickel and cobalt in trace amounts. Thus, the solution residue was passed through a packed column packed with an H-type chelate resin comprising a mixed bed of a resin having an iminodiacetate exchange group and a resin having an aminocarboxylate exchange group (a mixed bed of a commercially available Sumichelate MC30 and Sumichelate MC75; products of Sumitomo Chemical Co., Ltd.) at SV15 to remove these trace elements by adsorption. The resulting solution was found to contain the following elements (in g/liter):

Ni: less than 0.001, Co: less than 0.001, Mo: less than 0.001, V: less than 0.001, Cu: less than 0.001, Fe: less than 0.001, Al: 0.04.

The solution was subjected to waste treatment as a waste solution. Then, a 10% sulfuric acid solution was added to the chelate exchange resin containing the trace elements such as nickel and cobalt to elute the trace elements. The adsorbed elements were found to be completely eluted.

EXAMPLE 2

Valuable metals were separated and recovered in the same manner as in the process described in Example 1, except for using an equimolar amount of ammonia water in the place of ammonium sulfate used in step (3) of Example 1 for separating and recovering aluminum. Crystals of ammonium aluminum sulfate were obtained as a result. The crystals thus obtained were separated from the solution to obtain a starting solution for use in the extraction of molybdenum. The starting solution for extracting molybdenum yielded a pH of 4.0 and a standard oxidation-reduction potential (Ag/AgCl) of −75 mV. Furthermore, the solution was found to contain elements (in g/liter) as follows:

Ni: 6.2, Co: 2.4, Mo: 10.3, V: 16.4, Al: 6.3, Cu: 0.68, Fe: less than 0.01.

The solution was subjected to the separation and recovery of each of molybdenum, vanadium, nickel, and cobalt in approximately the same manner as in Example 1 to completely separate the aforementioned elements.

The waste solution discharged after the final step was found to contain the following elements (in g/liter):

Ni: less than 0.001, Co: less than 0.001, Mo: less than 0.001, V: less than 0.001, Cu: less than 0.001, Fe: less than 0.001, Al: 0.12.

EXAMPLE 3

Valuable metals were separated and recovered in the same manner as in the process described in Example 1, except for using, in step (4-1) of Example 2 for extracting molybdenum in separating and recovering molybdenum, N-dodecenyl(trialkylmethyl)amine in the place of N-lauryl(trialkymethyl)amine as the extracting agent component of the organic extracting solution. A result similar to that obtained in Example 1 was obtained.

It can be seen from the results of the Examples that the process according to the present invention enables an efficient separation and recovery of almost all the valuable metals present in the waste catalyst.

Furthermore, tests were performed to assure the feasibility of using repeatedly the regenerated organic phases in each of the reverse extraction steps for molybdenum and vanadium, of reusing the elution liquid of the chelate exchange resin in the reduction dissolution step, and of reusing the solution passed through the chelate resin in the separation and recovery of aluminum. No problems were found in the tests, and all of the used solutions enumerated above, i.e., the regenerated organic phases for use in the reverse extraction, the elution liquid of the chelate exchange resin, and the solution passed through the chelate resin, were found applicable to repeated use. It can be understood therefrom that all the chemicals can be used in the separation without any loss, This saves process steps and manpower necessary for the waste treatment and also reduces pollution. Furthermore, favorable phase separation states without generating clads and third phases were observed in all of the extraction steps. It was also confirmed that the roasted product was always completely dissolved in the reduction dissolution step.

As described in the foregoing, valuable metals can be almost completely separated and recovered from a waste catalyst by the process according to the present invention. The process according to the present invention is of great value from the viewpoint of industry, because it is based on a closed system which prevents environmental pollution from occurring.

While the invention has been described in detail and with reference to specific embodiments thereof, it will be apparent to one skilled in the art that various changes and modifications can be made therein without departing from the spirit and scope thereof.

What is claimed is:

1. A process for recovering Mo, V, Ni and Co valuable metals from a waste catalyst containing predominantly alumina and containing Mo, V, Ni and Co, comprising the steps of:
    (a) roasting the waste catalyst at a temperature of from 400° C. to 1000° C. to form a roasted product;
    (b) dissolving the roasted product with sulfuric acid in the presence of at least one added metal as dissolution catalyst selected from the group consisting of aluminum, nickel and cobalt to prepare a reducing solution;
    (c) separating and recovering aluminum from the reducing solution, while providing the reducing solution, from which aluminum has been separated, as a residual solution for extracting molybdenum there from;
    (d) extracting molybdenum from the residual solution of step (c) by contact with a solvent extractant selective to Mo and recovering extracted molybdenum, while providing the reducing solution, from which molybdenum was recovered, as a residual solution for extracting vanadium therefrom;
    (e) extracting vanadium from the residual solution of step (d) by contact with a solvent extractant selective to V and recovering extracted vanadium, while providing the reducing solution, from which vanadium has been recovered, as a residual solution for recovering nickel and cobalt therefrom; and
    (f) recovering nickel and cobalt from the residual solution of step (e).

2. A process for recovering valuable metals from the waste catalyst as claimed in claim 1, including, prior to said step (a), a step of removing oil from the waste catalyst.

3. A process for recovering valuable metals from the waste catalyst as claimed in claim 1, wherein said step (b) comprises dissolving said roasted product at a temperature of at least 70° C. under a non-oxidizing atmosphere and said dissolution catalyst is aluminum.

4. A process for recovering valuable metals from the waste catalyst as claimed in claim 1, wherein said step (b) is effected at a temperature of from 80° to 90° C.

5. A process for recovering valuable metals from the waste catalyst as claimed in claim 1, wherein said step (c) comprises precipitating ammonium alum from the reducing solution by adding at least one precipitant selected from the group consisting of ammonium sulfate solution, ammonia gas, ammonia water, and ammonium carbonate solution into said reducing solution.

6. A process for recovering valuable metals from the waste catalyst as claimed in claim 1, wherein said step (c) comprises passing hydrogen sulfide into said reducing solution to form iron sulfide which is then removed.

7. A process for recovering valuable metals from the waste catalyst as claimed in claim 1, wherein said step (d) comprises:
    adding acid to the residual solution to adjust a pH thereof to a range of from 0 to 4;
    adding an organic phase to the residual solution comprising an extracting agent and a diluent at a ratio by weight of the extracting agent to the diluent from 5:95 to 20:80, said extracting agent is at least one secondary amine expressed by a general formula R1-NH-R2, where R1 and R2 each represent an alkyl group having 12 or 13 carbon atoms, and said diluent is at least one selected from the group consisting of an aromatic hydrocarbon and a paraffin hydrocarbon; and reverse extracting molybdenum by adding caustic alkali solution to said organic phase which forms alkali molybdate or by adding ammonia water to said organic phase which forms ammonium molybdate.

8. A process for recovering valuable metals from the waste catalyst as claimed in claim 7, wherein, said extracting agent for molybdenum is at least one compound selected from the group consisting of an N-dodecenyl(trialkylmethyl)amine and an N-lauryl(trialkylmethyl)amine.

9. A process for recovering valuable metals from the waste catalyst as claimed in claim 7, wherein the caustic alkali solution has a concentration of from 0.5 to 5 mole/liter and the ammonia water has a concentration of at least 0.5 mole/liter.

10. A process for recovering valuable metals from the waste catalyst as claimed in claim 1, wherein the solvent extraction in said step (e) comprises:
adding acid the residual solution to adjust a pH value thereof to a range of from 1 to 4;
extracting vanadium from said residual solution obtained after recovering molybdenum therefrom into a vanadium-extracting organic phase by contacting said residual solution with an organic phase containing an extracting agent of mono-2-ethylhexyl 2-ethylhexylsulfonate and at least one diluent selected from the group consisting of an aromatic hydrocarbon and a paraffin hydrocarbon at a ratio by weight of the extracting agent to the diluent from 20:80 to 70:30; and
reverse extracting vanadium by adding a mineral acid solution of sulfuric acid to said organic phase which forms vanadium sulfate or by adding a mineral acid solution of hydrochloric acid to said organic phase which forms vanadium chloride.

11. A process for recovering valuable metals from the waste catalyst as claimed in claim 10, wherein said mineral acid solution has a concentration of from 0.05 to 2 mole/liter.

12. A process for recovering valuable metals from the waste catalyst as claimed in claim 1, wherein step (f) comprises:
adding caustic alkali to said residual solution to separate nickel and cobalt as individual hydroxides;
bringing the residual solution after the separation treatment into contact with a chelate resin to absorb nickel and cobalt which are present in trace amounts in the residual solution; and
immersing said resin into sulfuric acid to obtain nickel and cobalt as nickel sulfate and cobalt sulfate by elution from said resin.

13. A process for recovering valuable metals from the waste catalyst as claimed in claim 12, wherein the chelate resin is selected from the group consisting of an iminodiacetate exchange group resin.

* * * * *